United States Patent
Wong

(10) Patent No.: US 7,997,582 B2
(45) Date of Patent: *Aug. 16, 2011

(54) MULTI-PLAYER AUDIO GAME PLAYABLE ON INTERNET

(76) Inventor: Michael K. Wong, Honolulu, HI (US)

( * ) Notice: Subject to any disclaimer, the term of this patent is extended or adjusted under 35 U.S.C. 154(b) by 198 days.

This patent is subject to a terminal disclaimer.

(21) Appl. No.: 12/482,393

(22) Filed: Jun. 10, 2009

(65) Prior Publication Data

US 2009/0305784 A1 Dec. 10, 2009

Related U.S. Application Data

(63) Continuation-in-part of application No. 11/345,025, filed on Jan. 31, 2006, now Pat. No. 7,549,645.

(60) Provisional application No. 60/650,558, filed on Feb. 7, 2005.

(51) Int. Cl.
*A63F 9/18* (2006.01)
*G06F 15/02* (2006.01)

(52) U.S. Cl. ............. 273/430; 463/35; 463/42; 273/431

(58) Field of Classification Search .................... 463/35, 463/42; 273/430, 431
See application file for complete search history.

(56) References Cited

U.S. PATENT DOCUMENTS

| | | | |
|---|---|---|---|
| 5,106,097 A | 4/1992 | Levine | 273/237 |
| 5,462,275 A | 10/1995 | Lowe et al. | 463/4 |
| 5,695,401 A | 12/1997 | Lowe et al. | 463/4 |
| 6,267,379 B1 | 7/2001 | Forrest et al. | 273/431 |
| 6,497,412 B1 | 12/2002 | Bramm | 273/430 |
| 6,758,754 B1 * | 7/2004 | Lavanchy et al. | 463/42 |
| 6,845,408 B1 | 1/2005 | Lemke et al. | 710/18 |
| 2003/0008694 A1 | 1/2003 | Troy et al. | 463/1 |
| 2003/0071117 A1 | 4/2003 | Meade, II | 235/382.5 |
| 2004/0014524 A1 * | 1/2004 | Pearlman | 463/30 |
| 2004/0147301 A1 | 7/2004 | Ikeya | 463/9 |
| 2004/0148419 A1 | 7/2004 | Chen et al. | 709/231 |
| 2005/0059492 A1 | 3/2005 | Hedin et al. | 463/42 |
| 2005/0170873 A1 * | 8/2005 | Fishbach et al. | 463/9 |

* cited by examiner

*Primary Examiner* — Masud Ahmed
(74) *Attorney, Agent, or Firm* — Leighton K. Chong

(57) ABSTRACT

An audio game system and method playable with a website server having an online connection on a network such as the Internet to a plurality of computers for respective participants employs a website enabled to receive from each participant's computer a music file entry selected in response to a game question or challenge issued by the website and determining an ordering by time of response of a first-in-time music file entry and sending it for audio playback on the participants' computers as a winning entry to the game question or challenge. Preferably, a participant's time-of-response is measured by a client applet on each participant's computer, and sent with the music file entry to the website server to enable the server to determine at least a first-in-time response accurately despite differences in bandwidth and connection speeds of the participants' computers.

20 Claims, 7 Drawing Sheets

FIG. 5A

| (CHALLENGE:) | | (UPLOAD SONG) | |
|---|---|---|---|
| (SONG-NAME:) | (VOTE) | (PLAYER) | (SCORE) |
| | | | |
| | | | |
| | | | |
| | | | |

FIG. 5B

| "Be first to play a hip hop song" | | (UPLOAD SONG) | |
|---|---|---|---|
| (SONG-NAME:) | (VOTE) | (PLAYER) | (SCORE) |
| | Y | MJ | 0 |
| | Y | Kealoha | 0 |
| Gettin Jiggy-Smith | -- | Mike | 1 |
| | Y | Jon | 0 |

FIG. 5C

| "Play the best song to fall asleep to" | | (UPLOAD SONG) | |
|---|---|---|---|
| (SONG-NAME:) | (VOTE) | (PLAYER) | (SCORE) |
| Go To Sleep My B | | MJ | 0 |
| Hush Little Baby | | Kealoha | 0 |
| Rock-A-Bye Baby | | Mike | 1 |
| Syte Sleepy Remix | * | Jon | 1 |

FIG. 6A

| | Example of a Timing Chart | | |
|---|---|---|---|
| | WEBSITE | SIGNAL | PARTICIPANTS |
| 1 | Server | ⇐⇐⇐⇐ | Clients A,B,C,D (X) |
| 2 | Server | ⇒⇒⇒ | Clients A,B,C,D (X) |
| 3 | Server | ⇐ A  ⇐ D | Clients A,B,C,D (X) |
| 4 | Server | Δ ⇒  Δ ⇒  Δ ⇒  Δ ⇒ | Clients A,B,C,D (X) |
| 5 | Server | ⇐⇐⇐ | |

MULTI-PLAYER AUDIO GAME PLAYABLE ON INTERNET

This U.S. patent application is a continuation-in-part of U.S. patent application Ser. No. 11/345,025, of the same inventor, filed on Jan. 31, 2006, issued as U.S. Pat. No. 7,549,645 on Jun. 23, 2009, which claimed the benefit of the priority filing date of U.S. Provisional Application No. 60/650,558, filed on Feb. 7, 2005.

TECHNICAL FIELD

This invention generally relates to a multi-player audio game playable among participants on the Internet. In particular, it is directed to an online trivia-type game where players can compete with each other by answering musical challenge or trivia questions based on music that is in their personal music inventory on an Internet-connected computer or computing device.

BACKGROUND OF INVENTION

Many board games and console games commonly include multimedia components, sounds and/or music to attract and intrigue players of the games. For example, U.S. Pat. No. 6,267,379 to Forrest et al discloses a game host console connected to a plurality of player terminals for playing a multimedia trivia game with scoring for first-in-time and most correct responses. The players' responses are in the form of selections of text and/or images from multiple choices. U.S. Pat. No. 6,102,406 to Miles discloses an Internet-based game host service connected to remote players on computers for playing a scavenger hunt game for information obtained from websites. U.S. Pat. No. 5,916,024 to Von Kohorn shows a game host TV station connected to a plurality of remote game terminals or set-top boxes for playing TV-based broadcast games. The game terminals may be video game machines which can load game programs and score player inputs on keyboard or even voice input. U.S. Pat. No. 5,106,097 to Levine discloses a game host console connected to a plurality of player terminals for playing an audio quiz game based on audio clips played from recorded tracks of a CD. The players' responses are in the form of selections from multiple choices displayed to the players.

Similarly, U.S. Patent Appl. 2005/0059492 of Hedin et al shows a host console connected to a plurality of player devices in which the player devices can access a shared resource (display, input peripheral, etc.) through one of the devices. U.S. Patent Appl. 2004/0148419 of Chen et al shows a multimedia host computer connected to at least one player devices in which the player device is activated to provide an audio input to another player device. U.S. Patent Appl. 2004/0147301 Of Ikeya discloses a music-playing host console connected to at least one music-playing device (MIDI keyboard) in which a music piece is activated on the player device by the host and the MIDI inputs from the player's playing of the piece is recorded and scored by the host console.

While previous devices have generally used various arrangements of game host console connected to multiple player units for playing various music trivia or music-playing games, none of them allow a music challenge or trivia game to be played online by enabling players to compete against each other based on music that is in their personal music inventory on an Internet-connected computer or computing device.

SUMMARY OF INVENTION

In accordance with the present invention, an audio game system and related method playable with a website server having an online connection on a network such as the Internet to a plurality of computers for respective participants, comprises:

a website operable on the server for playing the audio game on the network with a plurality of computers for respective participants, wherein said website is enabled to receive from each participant's computer a music file selected by the participant as an entry for the game in response to a game question or challenge issued by the website from among a plurality of music files of a participant's music inventory maintained on the computer;

said website having a music file queuing procedure for determining an ordering by time of response of music files received by the website from the participants in response to the game question or challenge issued by the website; and said website having a winning response playback procedure for sending at least a first-in-time music file entry for audio playback on the participants' computers as a winning entry to the game question or challenge issued by the website.

In a preferred embodiment, the music file queuing procedure uses a time-of-response client applet downloadable to run on each participant's computer for measuring the participant's time-of-response from receipt of the game question or challenge issued by the website to the sending by the participant of a selected music file entry back to the website. The client applet can also test the relative time of travel for data between the website server and each client by sending a time-of-receipt measurement and time for sending a response to the website server when a music file is to be sent by the client to the server, thereby enabling the server to determine how long it takes a data message to make a round trip to each participant. The client applet provides an audio game interface in a browser operable on the client's computer, and can handle other game client functions, such as playing an audio output of music file entries transmitted by the website, voting, text entry, and keeping score.

Preferably, the website server is enabled with a voting function for receipt of votes from the game participants to determine whether a first-in-time music file entry meets the question or challenge criteria or not, and if not, to send a next-in-time music file entry as a winning entry. The website server can also use the voting function to determine votes by participants of which entry best meets the question or challenge criteria. The website server can also send the participant who sent the winning entry a button for acknowledging their winning entry and requesting a stop to the playback of the winning music file entry on all participants' computers. For playing back a winning entry, the website server preferably sends a streaming audio file to the participants' computers.

Other objects, features, and advantages of the present invention will be explained in the following detailed description of the invention having reference to the appended drawings.

BRIEF DESCRIPTION OF DRAWINGS

FIGS. 5A, 5B, and 5C illustrate examples of a computer client interface for the online audio game version.

FIGS. 6A and 6B show an example timing chart of the online audio game version

DETAILED DESCRIPTION OF INVENTION

Figure 1:
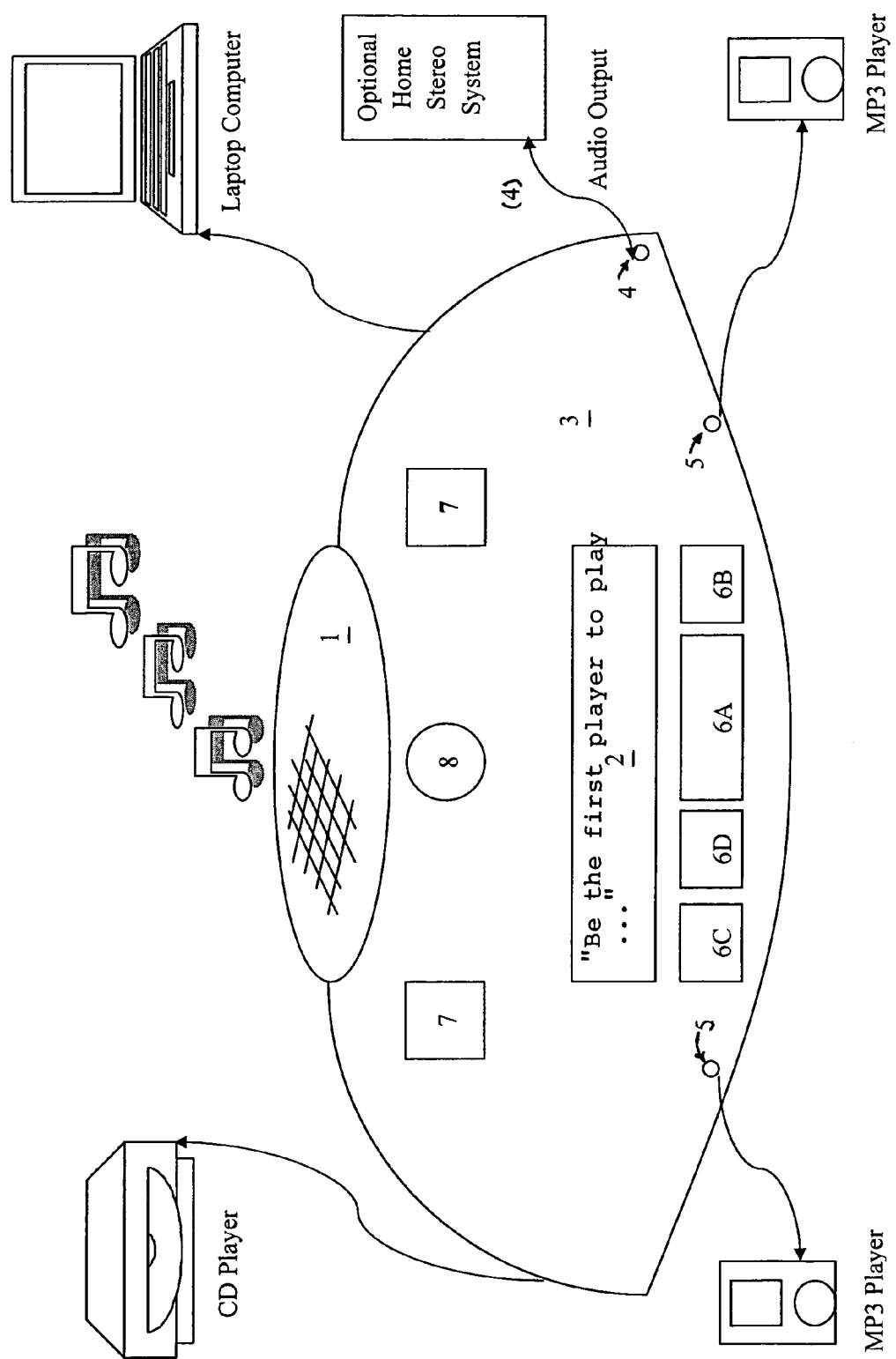
FIG. 1 is a schematic diagram of an audio game system and game console in accordance with the present invention.

In the following detailed description, certain preferred embodiments are described as implemented in a specific type of computerized environment with specific details set forth in order to provide a thorough understanding of the present invention. However, it will be recognized by one skilled in the art that the present invention may be practiced without these specific details or with equivalents thereof. Well known methods, procedures, components, functions have not been described in detail as not to unnecessarily obscure aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. In general, any type of general purpose, programmable computer system can be used by the present invention. A typical computer system has input and output data connection ports, an address/data bus for transferring data among components, a central processor coupled to the bus for processing program instructions and data, a random access memory for temporarily storing information and instructions for the central processor, a large-scale permanent data storage device such as a magnetic or optical disk drive, a display device for displaying information to the computer user, and one or more input devices such as a keyboard including alphanumeric and function keys for entering information and command selections to the central processor, and one or more peripheral devices such as a mouse. Such general purpose computer systems and their programming with software to perform desired computerized functions are well understood to those skilled in the art, and are not described in further detail herein.

Referring to FIG. 1, an audio game system and game console in accordance with the invention has a speaker 1 for playing back output audio signals as sound, a display 2 (such as an LCD) on one or more sides of a console body 3 for displaying music challenge or trivia questions and other game instructions, an audio output jack, wire, or plug 4 for sending output audio optionally to an external sound system, a number (here 4) of audio input jacks, wires, or plugs 5 and upwardly positioned "Enter" buttons 7 for enabling the players to input audio signals (digital or analog) for music selections from their respective audio player devices, game/display control buttons 6. If a player's entry is an incorrect response to a game challenge or trivia question, pressing the "Enter" button a second time is used to mute the player's incorrect music selection. A "Reset" button 8 is used to cancel a current game or start a new game.

Figure 2:
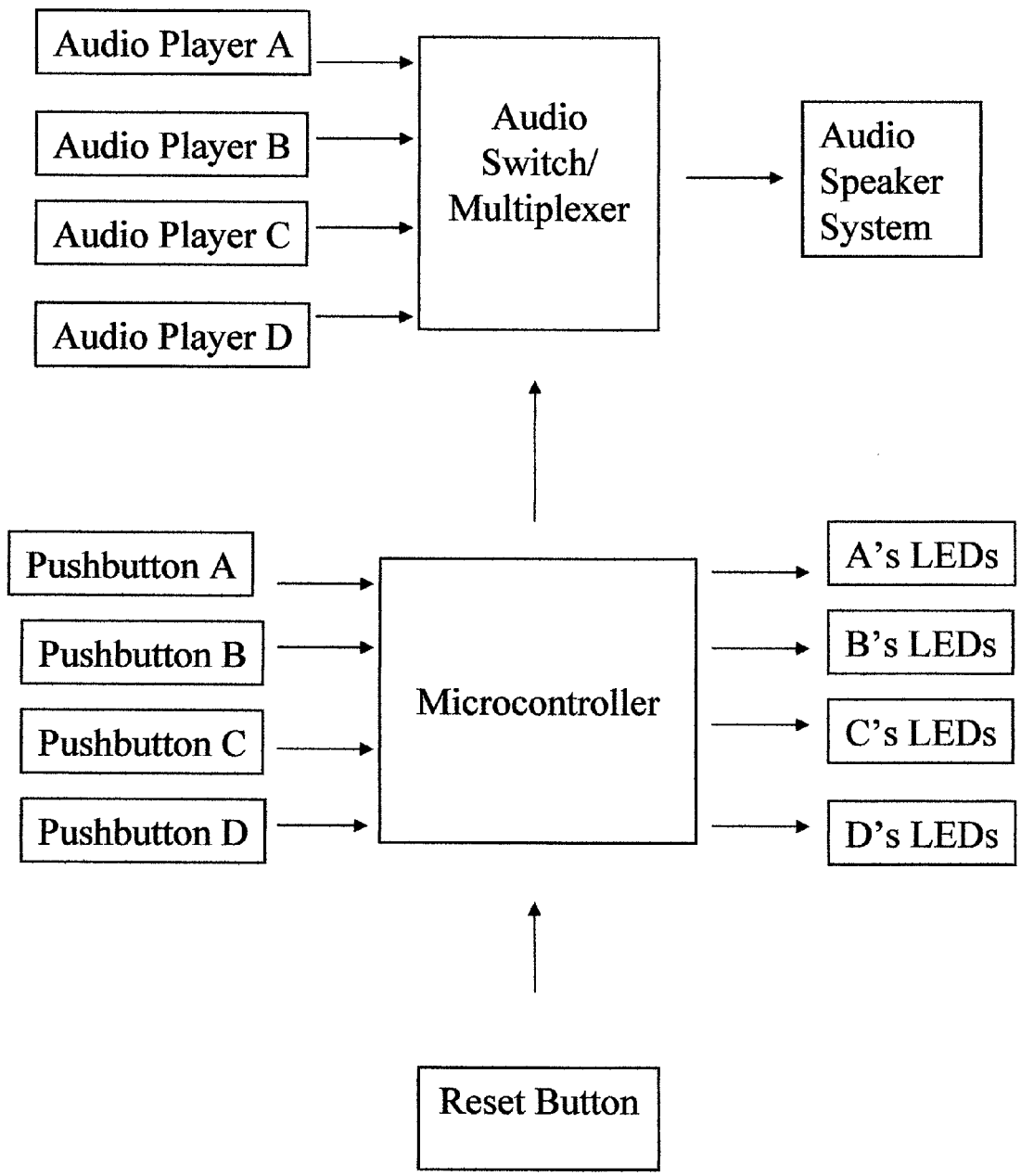
FIG. 2 is a block diagram of a preferred embodiment audio signal queuing circuit for the game console.

Referring to FIG. 2, a block diagram shows a preferred embodiment for the game console provided with a manual audio signal queuing circuit. The Audio Players A, B, C, D are plugged into the game console and connected to an Audio Switch/Multiplexer which latches the incoming audio signals. When the players press their "Enter" Pushbuttons A, B, C, D for inputting music selections from their respective Audio Player devices, a Microcontroller receives the Enter signals and sends a switch signal to the Multiplexer to release the first-in-time audio signal to the Audio Speaker System. If the first-in-time entry is rejected by the other players determining that it is an incorrect entry and press the player's "Entry" Pushbutton again, the first-in-time entry is muted and the next-in-time entry is released to the Audio Speaker System.

Figure 3:
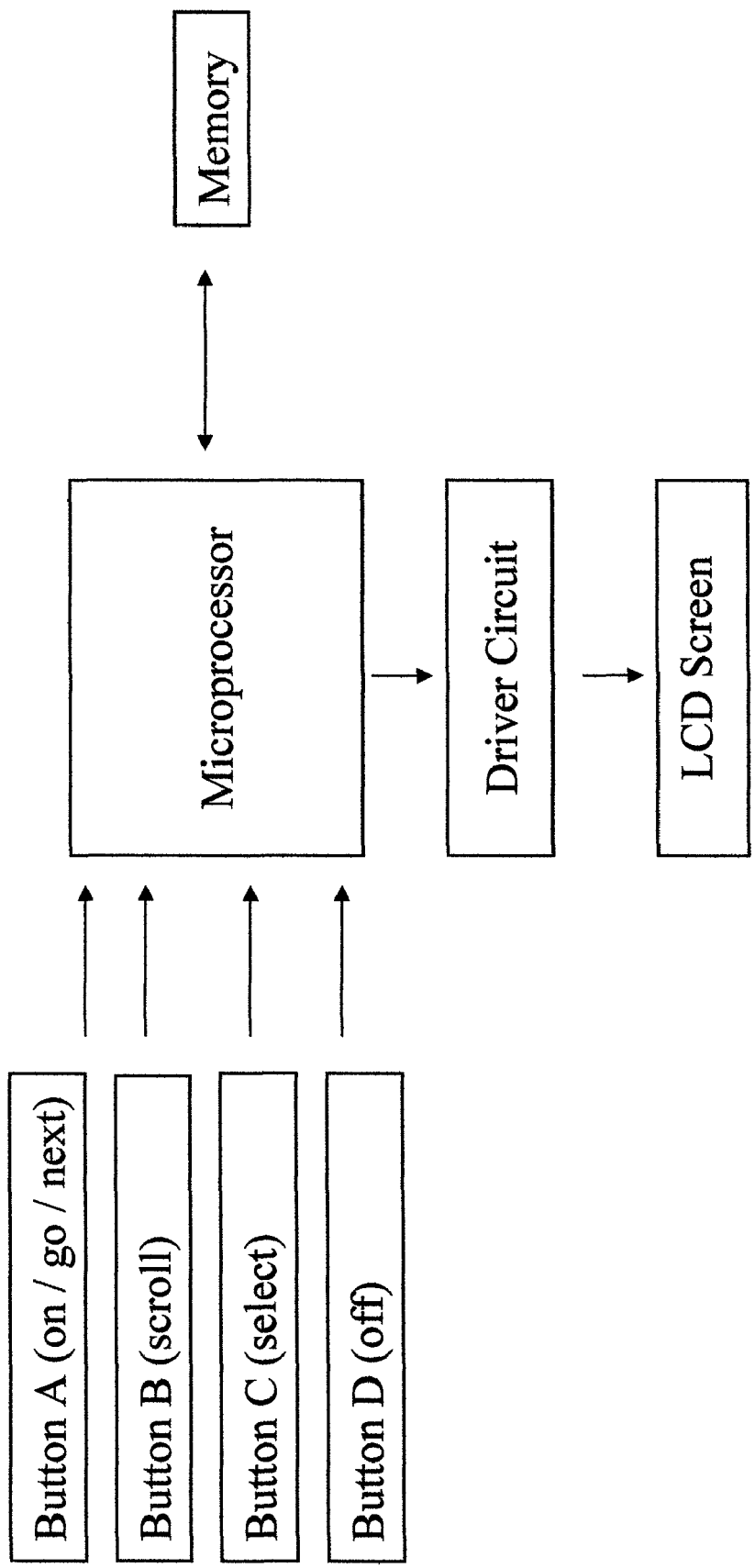
FIG. 3 is a block diagram of a game display control circuit for the game console.

Referring to FIG. 3, a block diagram illustrates display circuitry for the game console 3 having a Microprocessor and associated Memory for storing game questions and instructions and displaying them via a Driver Circuit on one or more LCD Screen(s) visible on the outside of the console. Inputs from buttons 6 to the Microprocessor include an on/go/next signal, a scroll signal, a select signal, and an off signal.

The audio game system challenges the participant(s) ability to find then play a selection from their audio player in the quickest time and/or with the most appropriate selection, given the specific game question. Upon pressing the "Start Game" or "Next Question" cue button 6, the participants are presented with a specific question or challenge for an audio selection on the display 2. The participants will use their audio player to find and play audio signals for an appropriate audio selection in response to the given criteria. The timeliness (first in time) and/or correctness of the audio selection will determine who has won the point(s) for that round. The signal queuing switch in the console's audio circuit will playback the audio selection that is first-in-time to the audio speaker, while simultaneously muting the input audio signals of the other participants. If the played entry is incorrect, the other participants can challenge the participant entering the played music, cut off his/her selection, and the console circuitry will then play the next-in-time entry. Upon playing and listening to the selection, the appropriateness of the selection is determined (by the participants) in relation to the criteria, and a score is given accordingly. Scoring and players scores are done manually.

Audio Game Play

Inherent in the Audio Game System are many variations of game play according to selected criteria and topics. Prior to starting, the participants will be able to choose which game they want to play by cycling through the "Scroll" button 6. They may want to choose to play a single and particular topic, a specified number of topics, or all the different topics. For example, the game topic may be "Word" and an example of a challenge may be "Be the first to play song that contains the word happy in it's title/lyrics", or the game topic may be "Message" and an example of a challenge may be "Be the first to play a song about sports", or the game topic may be "Greatest of all time" and an example of a challenge may be "Everyone play the greatest love song of all time", etc. Points awarded to the player who meets the various criteria may vary according to the different topics. The following are some types of criteria or topics and some examples of challenges within each topic that can be used for these audio games:

Word—Be the first to play a song with the word _____ in its title.
    e.g., happy, dance, dream, . . . .

Genre—Be the first to play a song in the _____ genre.
    e.g., hip hop, folk, fun k, acapella, . . . .

Artist—Be the first to play a song by _____.
    e.g., Bob Marley, a deceased artist, a lesbian artist, . . . .

Language—Be the first to play a song which contains _____.
    e.g., French, Spanish, African, . . . .

Emotion—Be the first to play a _____ song.
    e.g., love, sad, angry, optimistic Message—Be the first to play a song that sings about _____.
    e.g., war, politicians, sports, food Media—Be the first to play a song from a _____.
    e.g., TV show, movie soundtrack, Broadway Instrument—Be the first to play a song with _____ as its primary instrument.
    e.g., guitar, piano, drums, . . . .

Time—Be the first to play a _____ song.
    e.g., 60's, Motown, Christmas, high school Music Theory—Be the first to play a song _____.
    e.g., 4/4 time, that has a bridge, w/4 part harmony, . . . .

The following categories are not won with speed, the challenge may be more subjective. An example may be that participants will be instructed to vote on the most fitting selection with the exception that they cannot vote on their own. Each vote for a particular selection earns the participant a point.

The Greatest of All Time!—Everyone play what you think is the best _____ song.
    e.g., love, dance, influential, psyche up, sad Karaoke Time!—You must be able to sing all of the words to a _____ song.
    e.g., rap, reggae, . . . .

Trivia—Everyone play what you think is the _____ song.
    e.g., earliest rap song, latest heavy metal, . . . .

Another variation is how the topics/criteria are presented. The criteria can either be flashed upon a display on the console or they can be written on cards for the participants to choose and read. If the criteria are on cards, there can be different sets of cards based on topic, with each card having one question or set of criteria. Or there can be one of every topic per card, with a mode of choosing the topic prior to flipping and reading the card. Participants could take turns choosing the topic or there could be a die rolled correlating to a particular topic.

Game Console Construction

The Audio Game console can have many possible variations of construction. Having a microprocessor-driven LCD display on the console is probably the best and most engaging construction for game play. Participants will be able to see choices for games or topics they would like to play. Upon a participant pressing the On switch (6 in FIG. 1), the microprocessor can access the list of game playing options from an associated memory sends them to the driver circuit for the console's LCD display. Participants can use the "Scroll" button to scroll or move the display through the different options, and use the "Select" button to choose from the various topic. The "Go" or "Next" button is used to start the game after all selections are made and/or during play to go to the next challenge.

With each music criteria or topic, participants will use their audio player units to input an appropriate audio selection in response to the given criteria. The timeliness and/or appropriateness of the audio selection will determine who has won the point(s) for that round. With the playback of the first- or next-in-time audio selection, the LED lights will show the player position playing, and the other players can then judge whether the audio selection matches the given criteria.

Due to the different types of audio players that can be used (analog or digital), different ways to connect from the audio players to a console, and different types of audio switch mechanisms, there can be other variations for configuring the Audio Game console. Three different types of audio controller systems can be built. As described above, the most easily and inexpensively implemented is a manually operated system in which participants press designated "Enter" buttons on the console for their inputs, and a microcontroller then accepts the inputs in order in which audio entries will be played. A more advanced system would be one with an automatic controller system, in which an audio detection circuit detects the input audio from the different sources and determines their times-of-arrival as the order in which the audio entries will be played. The most advanced system will be totally MPU or CPU driven, in which all console functions are carried out under software programmed control.

The following table summarizes some possible combinations for construction of the Audio Game console:

| | Player | Signal | Connectivity (player to console) | Controller |
|---|---|---|---|---|
| 1 | Analog/Digital | Analog | Audio cables with ⅛" stereo plug | Manual |
| 2 | Analog/Digital | Analog | Audio cables with ⅛" stereo plug | Auto Circuit |
| 3 | Digital | Digital | USB 1.1 & 2.0 | MPU/CPU Driven |
| 4 | Digital | Digital | IEEE 1394/Firewire | MPU/CPU Driven |
| 5 | Digital | Digital | Proprietary | MPU/CPU Driven |
| 6 | Digital | Digital | Other | MPU/CPU Driven |
| 7 | Digital | Analog/RF | Wireless via Radio Frequency | Manual |
| 8 | Digital | Analog/RF | Wireless via Radio Frequency | Auto Circuit |

Instead of having multiple types of ports and audio circuits in one game console, different game console constructions can be packaged as different hardware types of game packages, e.g., "For Computers" or "For MP3 Players". Since the participants are providing their own audio players, the largest market initially will be for ⅛" stereo plugs that can connect to popular MP3 and audio player units.

Audio Game Playable on Internet

The audio game described above may also be configured to be playable online so that participants may play the game on computers or computing devices from remote locations through an online connection to a network such as the Internet. For purposes of the following description, the term "computer" is a general term for any device that can be programmed to perform any computing functions for a given purpose, which includes personal computers (PCs), laptop computers, game consoles, and mobile devices such as personal digital assistants (PDAs) or iPods such as from Apple Computer, and digital cellular phones. A computer may be programmed to perform specific procedures, steps, logic processes, symbolic operations on data, etc. The term "Internet" is a general term that includes any wide-area digital network or network of networks connecting users' computers through a common or industry-standard (TCP/IP) protocol. Users having a connection to the Internet commonly connect browsers on their computing terminal or device to visit websites that operate interactively with the browsers via web servers. The Internet can also be connected to other networks using different data handling protocols through a gateway or system interface, such as wireless gateways using the industry-standard Wireless Application Protocol (WAP) to connect Internet websites to wireless data networks.

Figure 4:
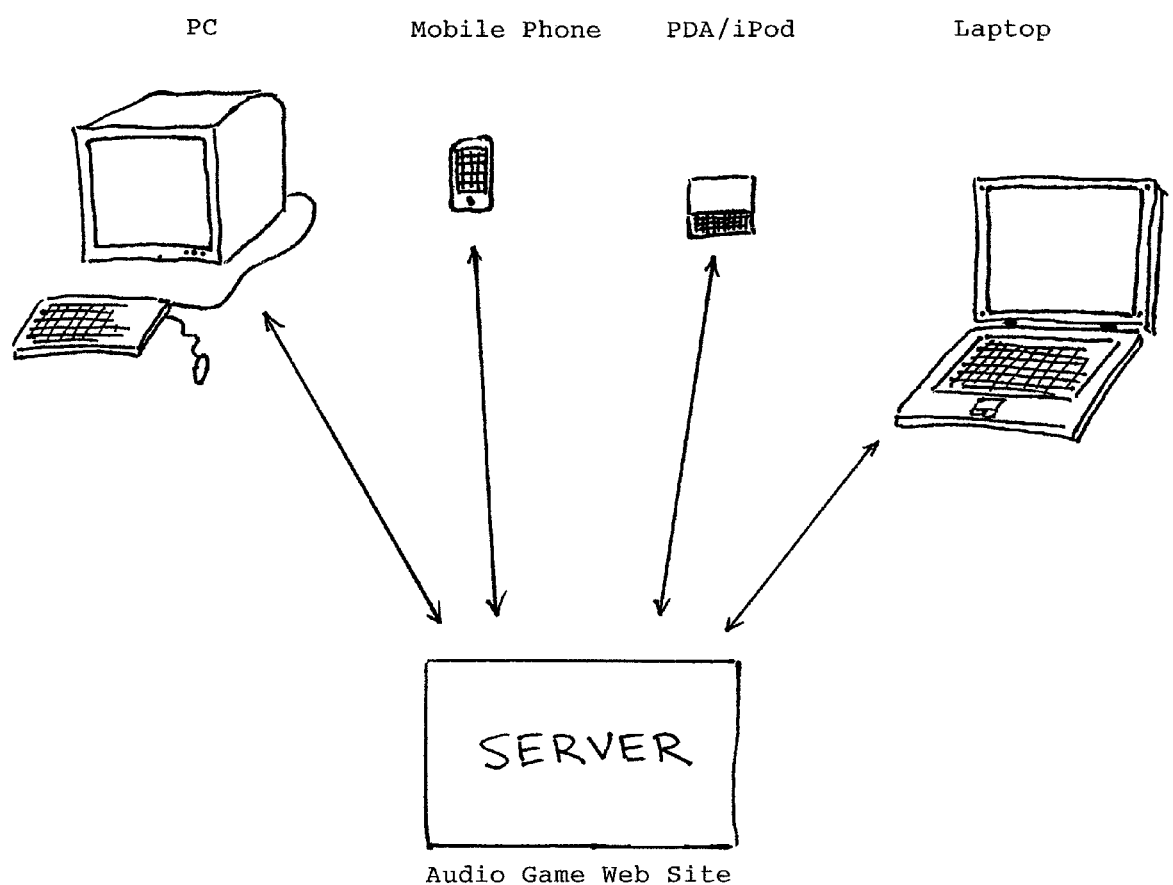
FIG. 4 shows an audio game version playable by a user on a computer or computing device which has an online connection to a network that connects it to a game website.

Referring to FIG. 4, the audio game is playable by a user on a computer or computing device such as a PC, mobile phone, PDA or iPod, laptop, etc., which has an online connection to a network that connects it to a game website operable on a web server. The website issues a game question or challenge to a plurality of users through their computers, and receives back responses of songs (music files) selected by the participants from among a plurality of music files of their own chosen music inventories maintained on their computers. The website specifies the format of data to be sent and received over the Internet and determines an ordering by time of response of the music files received from the participants in response to a game question or challenge, as well as keep track of other game functions such as votes and score points to facilitate proper game play. In a preferred mode, a client-side applet is downloadable to the participant's computer to establish the game platform (such as Adobe Flex/Flash) with a rich client interface in the browser and functions for measuring the participant's time-of-response and for playing an audio output of contest songs transmitted by the website on the network, as well as handle other defined functions, such as voting, text entry, keeping scores, etc.

In order to allow people with music files in different audio formats to play with one another, a server-side converter, such as FFMPEG may be used to convert a variety of different audio files uploaded (e.g., WAV, AAC, WMA, etc.) to a more general and commonly accepted file format such as MP3. To allow participants with different bandwidth and internet connectivity speeds to play with one another in a fair gaming environment, the game will not be based solely on the absolute speed in which the server received a participant's audio file response. Instead, the computer on the user side may have a game applet installed which clocks the time of response measured from when the participant received the question from the website until when they submitted their response. Thus it will not matter if people have neither different internet connection speeds nor whether they are playing in different time zones; it will only matter that the applet clock measures correctly the time of response. The website has a music file queuing procedure for determining an ordering by time of response of the audio files sent by the participants. The website also has a winning response playback procedure for transmitting to the participants' computers the music file determined by the music file queuing procedure to be first in time of response from the participants.

If a voting function is implemented, the participants can listen to the playback of the first-in-time response and cast a vote whether the first-in-time song selection met the challenge criteria or not. The website server will keep track of the votes, such as by excluding any vote by the first-in-time respondent and polling for a majority of the other participants. If the majority of the votes are "no" the song selection does not meet the criteria, then the second-in-time song input will be played back for all of the participants, and so on. The server will keep track of the votes, and assign points to the participant whose entry is accepted as correct, while perhaps deducting points from the participant whose entry is rejected as incorrect.

In another mode of audio game play, participants will be challenged to input the most appropriate song, e.g., "Play the best song to do yoga to." In these "most appropriate song" challenges, all of the participants will input a song, and will listen to all of the other participants' songs. Because the nature of this challenge is subjective, a vote will be held, and points will be awarded to the participant who received the most votes.

The preferred embodiment of the client applet may be programmed to determine the relative time travel differences for data between the server and clients. Thus, instead of basing the timing protocols on the fastest receipt of a relatively large music file, small messages will be sent back and forth from the server and each client applet as the question is presented, and when a music file is selected to upload. This will provide the server with the information of how long it takes for a simple message to make a round trip to each participant, and therefore understand the relative differences in time for data travel. When each participant uploads a song entry, a small (relative to the large size of an audio file) message/ticket will be sent ahead of time, thus providing the server with a more accurate understanding of the timing of each participant's play. With this information, the server will be able to wait for an appropriate amount of time before determining which participant truly took the shortest time from receiving the challenge to inputting a song selection, and consequently streaming that selection to all of the participants. If it takes 2 seconds for a message to make a round trip for the participant with a fastest connection, and 10 seconds for a participant with the slowest connection, and during speed sensitive play, the server receives a message that the participant with the fastest connection has selected a song to upload, the server will calculate that it should wait at least 8 seconds (the difference) before declaring the input from the fastest connected participant to be first in and streaming the audio to all of the participants.

FIGS. 5A, 5B, and 5C illustrate examples of a computer client (browser) interface for the audio game. FIG. 5A shows the interface before the start of a game with no participants playing. FIG. 5B shows an example of a speed challenge in which the first-in-time song entry by "Mike" is played back for voting by the other participants ("Yes" or "No") whether the song entry matched the challenge criteria. Since the others have voted "Yes" to his entry, Mike is awarded a score of "1". FIG. 5C shows an example of a challenge in which the participants are asked to vote on the most appropriate song entry. Participants will see and hear all of the song inputs in succession, then vote for the song (not their own) that they feel most matched the challenge criteria. In this case, "Jon" got most votes for "best song" and is awarded a score of "1".

Figure 6B:
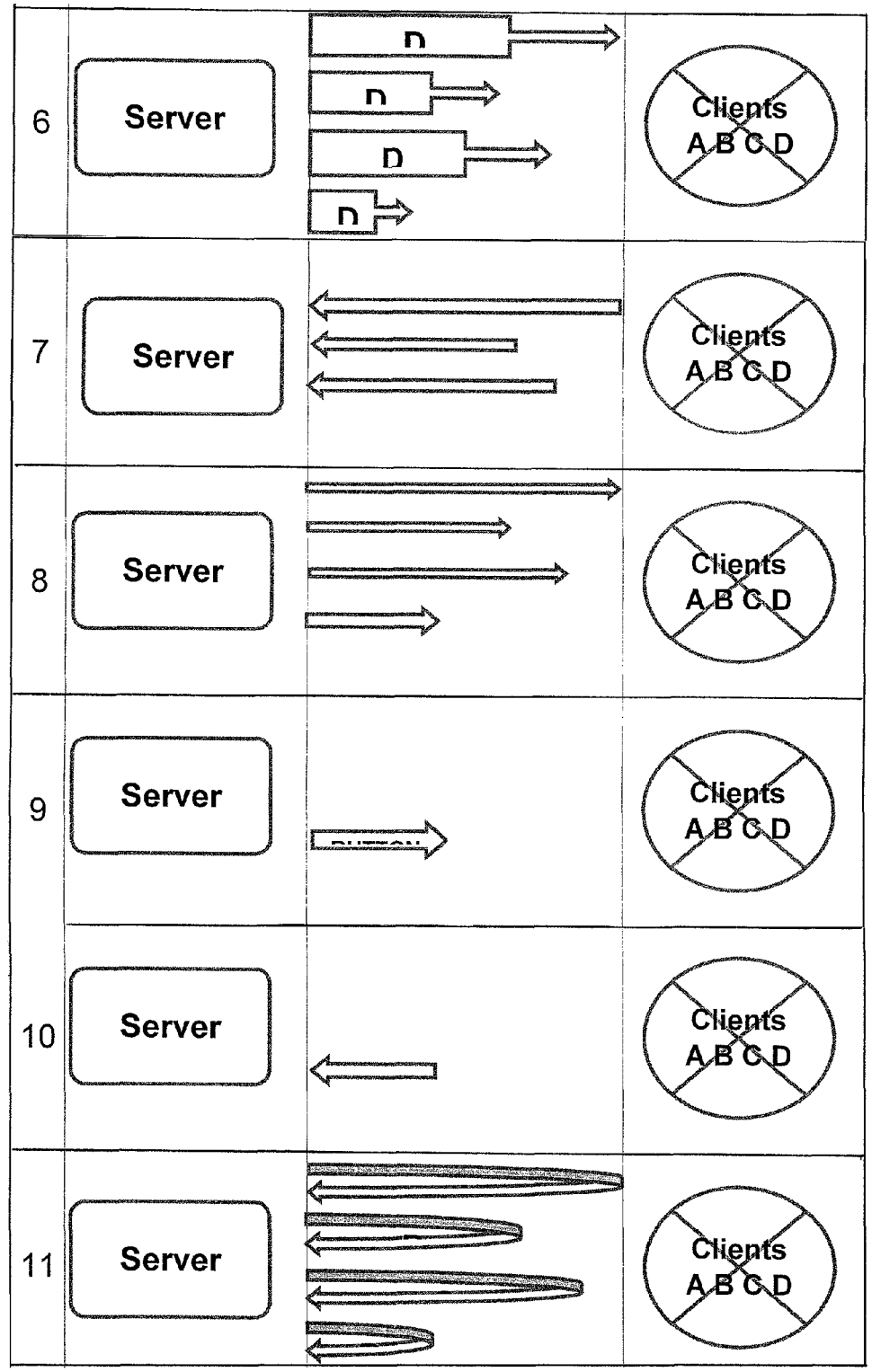

FIGS. 6A and 6B show an example of a timing chart for signal transmissions between the website and the participants for an online audio game. In FIG. 6A, Block 1, upon the start of the game, a ping is sent from the server to all of the clients to measure the time differences/lags it takes for data to travel from the server to the different clients and back. In the following illustrations, the length of the arrows are only to depict the differing travel time from the server to each client, thus one can see that Client A takes the longest time and Client D the shortest. In Block 2, a question/challenge for the game round is sent to all of the clients. The time of receipt at each client machine is noted by the client's time-of-response applet. In Block 3, the Clients will race to find an appropriate song to match the challenge criteria. A ping with information of the time elapsed from receipt of the challenge to sending an answer/music response (according to each client applet's clock) will be sent to the server before sending the larger music file. This elapsed time-of-response measurement will be used by the server to determine who is the first-in-time entry. Because the server knows that the travel time for data is faster to and from particular clients, it will wait an appropriate amount of time to ensure that each client had a fair chance even though their connection speed may not be fast. In Block 4, upon determining which client was the first-in-time entry, the website server streams that client's entry music file to all of the clients. In Block 5, the clients listen to the first-in-time song entry, and vote (except for the client whose entry is selected as first) whether the song did or did not match the question/challenge criteria. The majority vote will be used by the server to determine whether the first-in-time entry is the winner.

In FIG. 6B, Block 6, if the majority vote is NO (Block 5), then the next-in-time client's entry will be streamed to all of the clients and again, in Block 7, a vote will be held. It will be preceded by a ping informing each client of the vote results. This will continue until a song entry gets a majority YES vote. In Block 8, the server will inform all of the clients of this and give the winning the award of score point(s) by updating the scoreboard. In Block 9, the client who won the round will be sent a button empowering him/her to acknowledge winning and stop the streaming of the winning song. In Block 10, the winning client acknowledges winning by clicking the winner's button and sending a signal to the server to stop the streaming of the song to all of the clients. In Block 11, upon receipt of the button click, the server will immediately stop the streaming of the winning song and start another round of the game (return to Block 1). This entire process of game play will continue until a predetermined set of questions/challenges or winning score is met.

The audio game protocol may also be modified to let other types of participants on their computer devices access the game website to participate as judges or audience members who would have the applet function to participate in voting to reject an unsuitable entry or to score a most suitable entry or to have exclusive power over the voting such as in judging. As far as the game protocol is concerned, these judges/audience members will in effect have the same functionality as the originally defined participants except that they are not being asked to input a song to receive points, but rather they are there to evaluate the responses to the question/challenge entered by the participants and cast their vote.

It is to be understood that many modifications and variations may be devised given the above description of the principles of the invention. It is intended that all such modifications and variations be considered as within the spirit and scope of this invention, as defined in the following claims.

The invention claimed is:

1. An audio game system having audio playable on a website, having a website server connected to a network via internet to a plurality of computers for a plurality of participants, comprising:
the website operable on the server for playing the audio game on the network with the plurality of computers for the plurality of participants, wherein said website is enabled to receive from each participant's said plurality of computers a music file selected by the plurality of participant as an entry for the game in response to a game question or a challenge issued by the website;
The selected music file is from among a plurality of music files of the plurality of participant's music inventory maintained and stored on the plurality of the computers;
and an audio signal output for transmitting to the website the music file selected by the plurality of the participant in response to the game question or the challenge of the game to be played on the website;
said website having a music file queuing procedure for determining an order by time-of-entry of the selected music file by the plurality of participants' said music inventory in response to the game question or the challenge issued by the website; and
said website having a winning response playback procedure which is enabled by determination of the queuing procedure of at least a first-in-time music file entry out of plurality of entries which were transmitted to the website by the plurality of participants from their respective said music inventory as a winning entry to the game question or the challenge issued by the website; wherein the website server is enabled to send all of the plurality of participants the first-in-time music file entry for playback on their computers, and to send the winning participant an acknowledgment of the winning entry to enable an end to the current question and a start of a new question.

2. An audio game system according to claim 1, wherein the music file queuing procedure comprises a time-of-response client applet downloadable to run on each of the plurality of participant's computer for measuring the plurality of participant's time-of-response from receipt of the game question or the challenge issued by the website, and to send the selected said music file entry to the website.

3. An audio game system according to claim 2, wherein the client applet is configured to test the relative time of travel for data between the website server and each client by sending a time-of-receipt measurement and time for sending a response to the website server when said music file is selected to be sent by the client applet to the website server, thereby enabling the website server to determine how long it takes a data message to make a round trip to each participant, and therefore make adjustment for sending to or receiving from the client applet, a data message based on the relative difference in time for data travel.

4. An audio game system according to claim 2, wherein the client applet provides an audio game interface in a browser operable on the plurality of participants' computer.

5. An audio game system according to claim 2, wherein the client applet handles one or more other game client functions of the group consisting of playing an audio output of music file entries transmitted by the website, voting, text entry, and keeping score.

6. An audio game system according to claim 1, wherein the website server is enabled with a voting function for receipt of votes from the plurality of participants whether a first-in-time said music file entry meets the question or the challenge criteria or not, and if the voting is determined that it does not meet the criteria, then the website server is enabled to send a next-in-time music file entry as a winning entry.

7. An audio game system according to claim 1, wherein the website server is enabled with a voting function for receipt of votes from the plurality of participants, and the website server is enabled to select the music file entry voted as a best winning entry.

8. An audio game system according to claim 1, wherein the website server is enabled to inform all of the plurality of participants of a winning entry and to update a game scoreboard.

9. An audio game system according to claim 1, wherein the website server is enabled to send the plurality of participant who sent the winning entry a button for acknowledging their winning entry and requesting a stop to the playback of the winning music file entry on all of the plurality of participants' computers.

10. An audio game system console according to claim 1, wherein the website server is enabled to send a streaming audio file for a winning entry to all of the plurality of participants' computers, and each of the plurality of participant's computer is enabled to playback an audio of the streaming audio file.

11. A method of playing an audio game online on a website, having a website server connected to a network via internet to a plurality of computers for a plurality of participants, the steps comprising:
- the website issuing a game question or a challenge to each of the plurality of participant requiring selection of a song represented by a music file stored and maintained as an inventory on the plurality of computers for the plurality of participants in response to the game question or the challenge;
- transmitting audio signal output to the website for the music file selected by the plurality of participant in response to the game question or the challenge of the game to be played on the website;
- the website receiving the plurality of participants' selections made from the plurality of computer's said inventory of the music file as a response entry to the game question or the challenge issued by the website;
- the website determining an order by the time of response of the music file selections received from the participants as a first-in-time music via the queuing procedure in response to the game question or the challenge issued by the website; and
- the website server sending all of the plurality of participants the first-in-time music file entry for playback on the plurality of participants computers, and sending the winning participant an acknowledgment of the winning entry to enable an end to the current said question or the challenge and a start of a new question.

12. An audio game method according to claim 11, wherein the plurality of participant's time-of-response to the game question or the challenge is measured by a client applet on each of the plurality of participant's computer for measuring the plurality of participant's time-of-response from receipt of the game question or the challenge issued by the website to the sending by the participant of a selected music file entry back to the website.

13. An audio game method according to claim 12, wherein the client applet is configured to test the relative time of travel for data between the website server and each client by sending a time-of-receipt measurement and time for sending a response to the website server when said music file is selected to be sent by the client applet to the website server, thereby enabling the website server to determine how long it takes a data message to make a round trip to each participant, and therefore make adjustment for sending to or receiving from the client applet, a data message based on the relative difference in time for data travel.

14. An audio game method according to claim 12, wherein the client applet provides an audio game interface in a browser operable on the plurality of participants' computer.

15. An audio game method according to claim 12, wherein the client applet handles one or more other game client functions of the group consisting of playing an audio output of music file entries transmitted by the website, voting, text entry, and keeping score.

16. An audio game method according to claim 11, wherein the website server is enabled with a voting function for receipt of votes from the plurality of participants whether a first-in-time said music file entry meets the question or the challenge criteria or not, and if the voting is determined that it does not meet the criteria, then the website server is enabled to send a next-in-time music file entry as a winning entry.

17. An audio game method according to claim 11, wherein the website server is enabled with a voting function for receipt of votes from the plurality of participants, and the website server is enabled to select the music file entry voted as a best winning entry.

18. An audio game method according to claim 11, wherein the website server is enabled to inform all of the plurality of participants of a winning entry and to update a game scoreboard.

19. An audio game method according to claim 11 wherein the website server is enabled to send the plurality of participant who sent the winning entry a button for acknowledging their winning entry and requesting a stop to the playback of the winning music file entry on all of the plurality of participants' computers.

20. An audio game method according to claim 11, wherein the website enables other types of participants to participate as judges or audience members in voting to reject an unsuitable entry or to score a most suitable entry or to have exclusive power over voting such as in judging.

* * * * *